M. TOULMIN.
Improvement in Marine Camels.
No. 125,352.  Patented April 2, 1872.
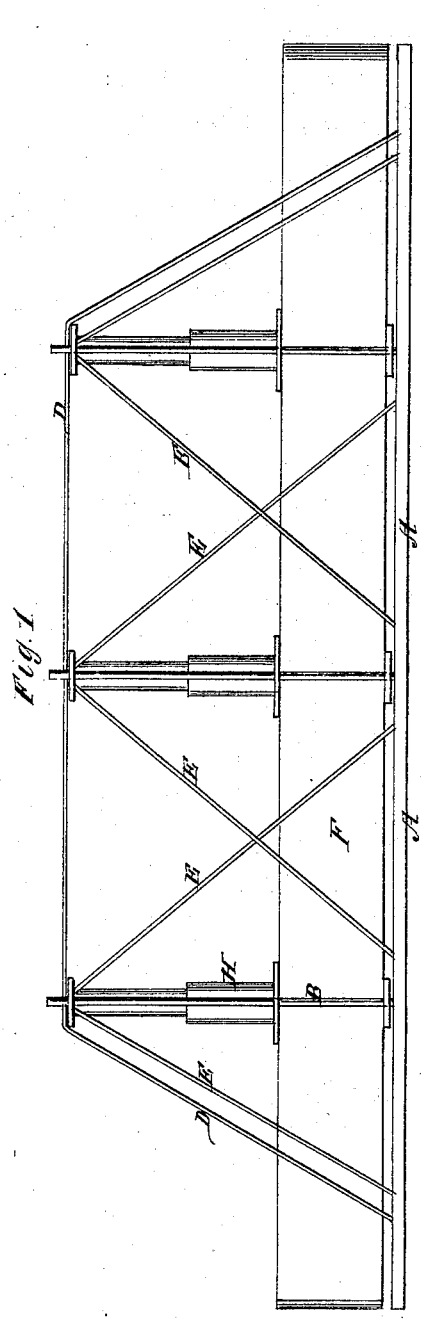
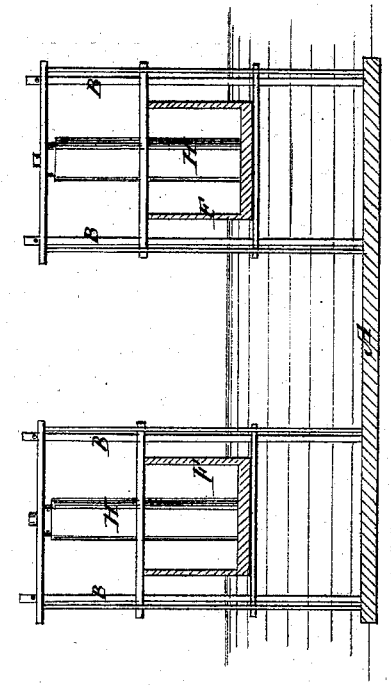
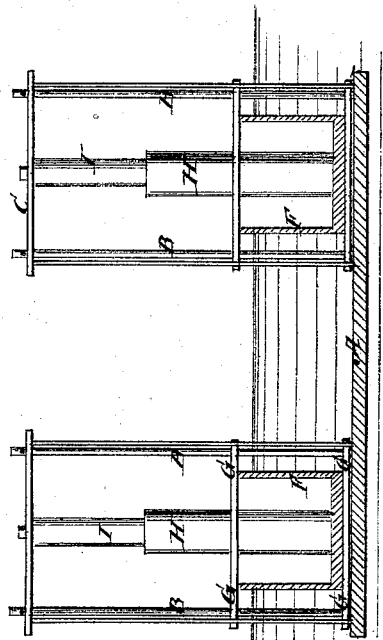
Witnesses:
E. Wolff.
Francis McArdle.
Inventor:
M. Toulmin
Per Munn & Co.
Attorneys.

125,352

UNITED STATES PATENT OFFICE.

MORTON TOULMIN, OF NEW ORLEANS, LOUISIANA.

IMPROVEMENT IN MARINE CAMELS.

Specification forming part of Letters Patent No. 125,352, dated April 2, 1872; antedated March 23, 1872.

*To all whom it may concern:*

Be it known that I, MORTON TOULMIN, of New Orleans, in the parish of Orleans and State of Louisiana, have invented a new and Improved Lighter-Ship; and I do hereby declare that the following is a full, clear, and exact description thereof, which will enable others skilled in the art to make and use the same, reference being had to the accompanying drawing forming part of this specification.

My invention relates to improvements in lighter-ships, for assisting vessels of deep draught over shoals, and for raising them for repairs and the like; and it consists in a pair of ships mounted on a platform, at a suitable distance apart to admit the ship to be raised between them, and on vertical rods rising from the platform, so as to rise and fall on said rod, or the rods or platform may rise and fall relatively to the ships, and the ships are provided with hydraulic engines which are so arranged between the ships and a framing at the tops of the posts that the frame, posts, and platform may be raised after the latter has been sunk and adjusted under the vessels to be raised, or the latter moved over it by the filling of the engines with water forced in, all as hereinafter described.

Figure 1 is a side elevation of my improved lighter. Fig. 2 is a cross-section, showing the platform sunk to receive and raise a vessel; and Fig. 3 is a cross-section, showing the positions of the parts when the vessel has been raised.

Similar letters of reference indicate corresponding parts.

A is a broad platform with a set of long posts, B, rising up from each side, and connected at the top by strong cross-pieces C in one direction, and by rods D in another, the latter being connected to the platform at each end, and rising up over the top of the posts in the manner of the chords of a bridge. The said posts are also provided with braces E, which, together with the rods D and cross-pieces C, form a strong top-framing capable of lifting the platform and a ship upon it. F represents the ships mounted on said platform. They have suitable guides G fitted on the posts to cause them to work truly thereon in moving up or down relatively to them. H represents hydraulic engines placed on said ships or vessels F, with the pistons I connected to the cross-pieces C.

By exhausting the engines the platforms can be let down below the bottom of the ships F as much as the distance between the cross-pieces C and the tops of the engines; then, by forcing water into the engines, the platform and frame, together with the ship on the platform, will be lifted as much as the ships F are capable of floating them.

Having thus described my invention, I claim as new and desire to secure by Letters Patent—

The combination of the platform A, ships F, hydraulic engines, posts B, and the top-framing, all substantially as specified.

MORTON TOULMIN.

Witnesses:
J. BRENAN,
I. P. MCKINNON.